(12) United States Patent
Ng

(10) Patent No.: US 7,893,663 B2
(45) Date of Patent: Feb. 22, 2011

(54) METHOD AND APPARATUS FOR ACTIVE POWER FACTOR CORRECTION WITHOUT SENSING THE LINE VOLTAGE

(76) Inventor: ShekWai Ng, BeeLab Semiconductor Ltd., 2/F Dah Sing Life Bldg., 99 Des Voeux Road Central, Hong Kong SAR (CN)

( * ) Notice: Subject to any disclaimer, the term of this patent is extended or adjusted under 35 U.S.C. 154(b) by 0 days.

(21) Appl. No.: 12/041,650

(22) Filed: Mar. 3, 2008

(65) Prior Publication Data

US 2008/0211463 A1  Sep. 4, 2008

Related U.S. Application Data

(60) Provisional application No. 60/892,866, filed on Mar. 4, 2007.

(51) Int. Cl.
*G05F 1/70*  (2006.01)
(52) U.S. Cl. .................................................. 323/207
(58) Field of Classification Search ............... 323/207; 363/21.05, 21.13
See application file for complete search history.

(56) References Cited

U.S. PATENT DOCUMENTS

| | | | | |
|---|---|---|---|---|
| 5,757,635 A | * | 5/1998 | Seong | 363/89 |
| 5,818,707 A | * | 10/1998 | Seong et al. | 363/89 |
| 7,042,743 B2 | * | 5/2006 | Pidutti et al. | 363/89 |

* cited by examiner

*Primary Examiner*—Shawn Riley

(57) ABSTRACT

A power factor correction apparatus which uses Pulse Frequency Modulation (PFM) to control an AC/DC converter is disclosed. Only a current signal from the converter is used to determine the switching frequency. Sensing of the input line voltage is not needed. The switching frequency varies with the line voltage such that the converter emulates a resistive load. By using PFM control, EMI is spread over a range rather than concentrated at a few frequencies. Thus a smaller EMI filter can be used. Since the switching frequency decreases with the loading of the converter, the switching loss decreases with the loading as well. Thus, the need of meeting efficiency standards, e.g. the 80 PLUS and Energy Star, can be fulfill without extra circuitry.

8 Claims, 11 Drawing Sheets

METHOD AND APPARATUS FOR ACTIVE POWER FACTOR CORRECTION WITHOUT SENSING THE LINE VOLTAGE

FIELD OF INVENTION

The present invention relates to the field of switching mode power supplies. More particularly, the present invention relates to a method and apparatus which controls the operation of a AC/DC converter using Pulse Frequency Modulation to achieve high power factor and low standby power at light loading without sensing the line voltage.

BACKGROUND OF INVENTION

There is a need for all power supplies connected to the mains to meet the harmonic limits of the European standard EN-61000-3-2 or similar in other countries. There are further needs to meet efficiency standards, e.g. 80 PLUS and Energy Star, in future. Prior arts which can meet the EN-61000-3-2 requirements can be divided into two categories.

The first category (U.S. Pat. No. 4,437,146, U.S. Pat. No. 5,134,355, U.S. Pat. No. 5,654,880, U.S. Pat. No. 6,900,623, US2006/0158912) senses the rectified AC voltage and controls the operation of the converter using a feedback loop such that the line input current drawn by the converter follow the rectified AC voltage. This category suffers from the problem of feedback loop stability when the AC line voltage varies over a wide range, e.g. from 115 AV to 240 VAC. They use complicated compensation network to ensure stability and is susceptible to noise and distortion in the rectified AC voltage. For example, the prior art U.S. Pat. No. 6,900,623 senses the RMS value of the AC line voltage and scales the loop gain accordingly. This category uses a multiplier to generate a reference sinusoidal signal. However, it is hard to have a good multiplier which can operate at large input signal and this problem bounds the best achievable power factor.

The second category (U.S. Pat. No. 5,867,379, U.S. Pat. No. 5,742,151) uses a nonlinear carrier signal without sensing the rectified AC voltage to generate the same control signal as in the first category. However, they are applicable to limited type of converters only.

Both categories use Pulse Width Modulation (PWM) to control the switch inside the AC/DC converter and suffer from the problem of concentrated EMI. There are studies in prior arts on the merit of using Pulse Frequency Modulation (PFM) or Frequency Modulation (FM) instead of PWM control to alleviate the EMI problem such that a smaller and cheaper EMI filter can be used instead. However, these prior arts use a dedicated unit to adjust the switching frequency while the pulse width is controlled by another unit. Thus the complexity of the design becomes double.

Lastly, in order to meet efficiency standards, e.g. the 80 PLUS and Energy Star, extra circuitry is needed to override the normal control of these power factor controllers and reduce the power consumption at light loading. This implies extra circuitry and more complex control to ensure the controllers transit smoothly between the light loading mode and normal loading mode.

The PFM approach is a well known solution to provide smooth transition between the light loading mode and normal loading mode. However, conventional AC/DC converters which do not has a Power Factor Correction front stage will suffer from the problem of larger output ripple at medium load. However, this is not a concern for two-stage AC/DC converter which has a Power Factor Corrector as the front stage and a DC/DC converter as the second stage.

Thus, there is a need to combine the functions of power factor correction and the PFM into a single controller to overcome all problems in the prior arts.

SUMMARY OF INVENTION

Accordingly, an object of the present invention is to provide a power factor control apparatus which can improve power factor and reduce the harmonic of the input current of an AC/DC converter.

Another object of the present invention is to provide a power factor control apparatus which has low power consumption under light loading or no load condition.

Another object of the present invention is to use PFM to control the AC/DC converter such that the converter can transit smoothly between light loading mode and normal loading mode.

Another object of the present invention is to provide a power factor control apparatus which can improve the EMI performance of the AC/DC converter.

Another object of the present invention is to provide a power factor control apparatus which is able to operate over a wide range of line input voltage.

Another object of the present invention is to provide a power factor control apparatus which does not use a multiplier in its feedback loop.

Another object of the present invention is to provide a power factor control apparatus which does not sense the line voltage in its feedback loop.

Another object of the present invention is to provide a power factor control apparatus which has current limiting function.

The present invention uses PFM to control the AC/DC converter. Since the pulse width is fixed, simple and linear equations can be derived to relate the integrals of the line currents and the integrals of the pulse off time. Thus the present invention only needs simple integrators to compute the pulse off time. Although the basic concept of the present invention assumes a fixed pulse width, the derived equation and the implementation merely require the pulse width be a variable independent of the pulse off time. The advantages and usages of this feature will be demonstrated later in the next section.

An innovation feature of the present invention is the elimination of a multiplier in the feedback loop to control the AC/DC converter. Another innovation feature of the present invention is the elimination of a nonlinear carrier wave in the current control loop. Another innovation feature of the present invention is the integration of PFM into the power factor correction method. Another innovation feature of the present invention is the current limiting function is integrated into the PFM unit such that the control circuitry is simpler.

An advantage of the present invention is the use of simple integrators only such that theoretical unity power factor can be achieved. Another advantage of the present invention is that the conducted EMI is improved over the prior arts. Another advantage of the present invention is the switching loss of the AC/DC converter under controlled falls with the loading because the switching frequency decreases under light loading. Another advantage of the present invention is the switching frequency falls with the loading of the converter such that the no extra circuitry is needed to reduce the power consumption when the loading is light.

Thus the present invention has a number of improvements over the prior arts.

These and other objects and advantages of the present invention will become clear to those skilled in the art in view

DETAIL DESCRIPTION OF THE PREFERRED EMBODIMENT

Figure 1:
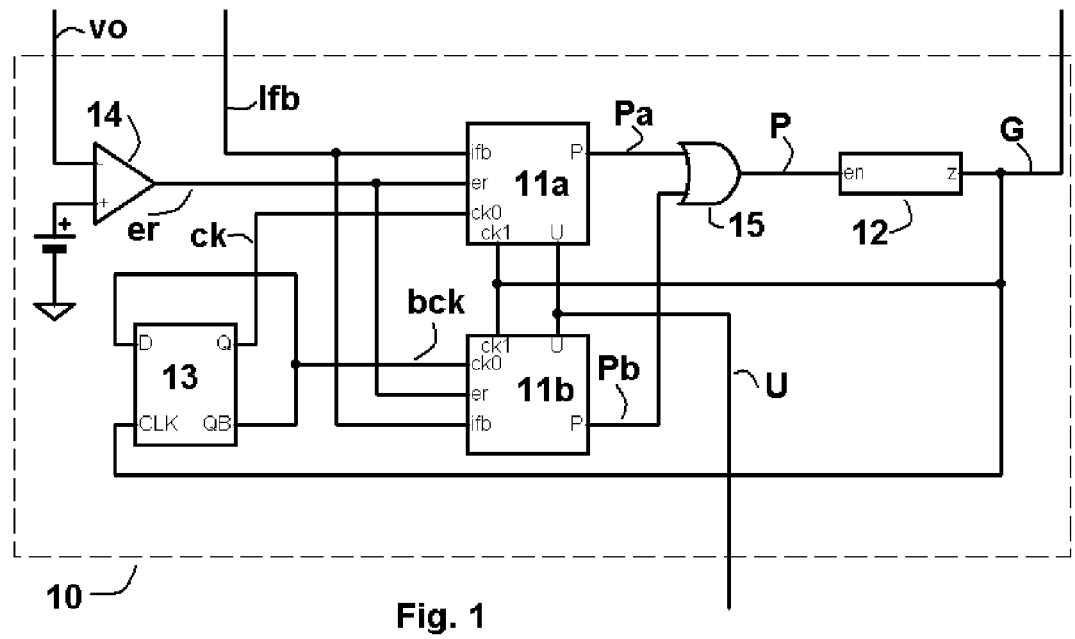
FIG. 1 illustrates an embodiment of the present invention.

The prior art U.S. Pat. No. 5,867,379 set forth a means to provide power factor correction without sensing the line voltage. The basic assumption behind U.S. Pat. No. 5,867,379 is that the pulse on time is unknown but the switching period is fixed. To maintain the causality of the derived equation, the same approach can only be applied to limited type of switching converters. However, by allowing the pulse on time be fixed and the pulse off time be an unknown, the causality of the derived equation can be assured in all kinds of converters. Thus Pulse Frequency Modulation (PFM) instead of PWM is used. The immediate advantage is that the resulting equations are linear and are well suitable for implementation in hardware using simple integrators. This PFM approach is the basis of the present invention.

For a boost converter working in the continuous mode, the inductor current $I_L$, the output voltage $V_o$, the target output voltage $V_r$, the rectified line voltage $V_g$, the switch on time $T_1$, and the switch off time $T_0$ can be related by the following equations, $$[1/(T_1+T_0)]\int_0^{T1+T0} I_L dt = kV_o T_0/(T_1+T_0) \qquad (1)$$

$$\Rightarrow \int_0^{T1+T0} I_L dt = p(V_r - V_o)T_0 - peT_0 \qquad (2)$$

where k and p are constants which depends on the circuit components and e is the error voltage.

One may note that when $T_1$ is fixed and $T_0$ is an unknown, the equation above can implemented in hardware using a simple integrator. The exact hardware implement will be detailed in the embodiments shown later in this section.

By the same principle, one may derive similar equations for different combinations of converter topology and sensed current. They are summarized in the following table.

TABLE 1

| Topology | Inductor current ($I_L$) | Diode current ($I_d$) | Switch current ($I_s$) |
|---|---|---|---|
| Boost | $\int_0^{T1+T0} I_L dt =$ $\int_{T1}^{T1+T0} pe\,dt$ | $\int_{T1}^{T1+T0} I_d\,dt +$ $\int_{T1}^{T1+T0}\int_{T1}^{T1+T0} I_d\,dt \sim$ $\int_{T1}^{T1+T0}\int_{T1}^{T1+T0} pe\,dt$ | $\int_0^{T1} I_s\,dt +$ $\int_{T1}^{T1+T0}\int_0^{T1} I_s\,dt \sim$ $\int_{T1}^{T1+T0} pe\,dt$ or $\int_0^{T1+T0}\int_0^{T1} I_s\,dt \sim$ $\int_{T1}^{T1+T0}\int_0^{T1} pe\,dt$ |
| Flyback or Isolated Zeta | | | $\int_0^{T1} I_s\,dt =$ $\int_{T1}^{T1+T0} pe\,dt +$ $\int_{T1}^{T1+T0}\int_{T1}^{T1+T0} pe\,dt$ or $\int_0^{T1}\int_0^{T1} I_s\,dt =$ $\int_{T1}^{T1+T0}\int_0^{T1+T0} g(t)pe\,dt$ |
| Buck or Forward | $\int_0^{T1} I_L\,dt =$ $\int_0^{T1+T0}\int_0^{T1+T0} pe\,dt$ | | $\int_0^{T1+T0} I_s\,dt =$ $\int_0^{T1+T0}\int_0^{T1+T0} pe\,dt$ |
| SEPIC or CUK | $\int_0^{T1+T0} I_L\,dt =$ $\int_{T1}^{T1+T0} pe\,dt +$ $\int_{T1}^{T1+T0}\int_{T1}^{T1+T0} pe\,dt$ or $\int_0^{T1}\int_0^{T1+T0} I_L\,dt =$ $\int_{T1}^{T1+T0}\int_0^{T1+T0} g(t)pe\,dt$ | | |

In the table above, some equations have an approximation sign (~) because the corresponding equation involves an assumption that the line input current is roughly constant over the switching period and so the sensed current is a good approximation of the line input current. In these cases, the resultant power factor will be inferior. The variable g(t) equals one during $T_1$ interval and equal two during $T_0$ interval.

Some of the combinations have two equations. One is derived on the assumption that $T_1$ is a constant and the other assumes $T_1$ is a variable which depends on the peak current. This feature can be used for current limiting such that the peak current is bounded. This current limiting feature has a number of advantages. The pulse width $T_1$ can be adjusted cycle by cycle to limit the maximum current. One may also use a larger $T_1$ when the line voltage is low and use a smaller $T_1$ when the line voltage is high, e.g. near the peak of the sinusoidal line voltage. Then this will help keeping the converter working in the continuous mode.

For all existing power factor correctors, the maximum switch current is inverse proportional to the maximum line voltage. Since the regulation specifies that the power factor corrector is to be operative from 90 VAC to 270 VAC line input voltage, the rating of the switch must be higher than the peak current at 90 VAC. Then the rating of the switch becomes excessive when the converter is running at 220 VAC. However, if an inferior power factor can be tolerated at low line input voltage, we may bound the peak current of the switch, e.g. a near sinusoidal waveform with a flat top, at low line input voltage. By bounding the peak current, we may use a lower rating and lower cost switch. Current limiting will also keep the converter working in continuous mode for the whole range of line input voltage. In the continuous mode, the line input current ripple will be smaller and a smaller EMI line filter can be used. Thus a variable pulse width and variable frequency modulator is advantageous.

Some entries of the table are empty because the corresponding combinations have no merit over other choices of sensed current. Therefore the application of the present invention is not demonstrated on these combinations. If it is desired, one may fill in the empty entries by using the same principle of derivation. The invention disclosed here is applicable to all kinds of converters and all kinds of sensed current and is obvious to those who are skilled in the art.

The invention will now be described by the following embodiments. These embodiments are not intended to limit the scope of the present invention but are to demonstrate the invention only. All features and combinations described in the embodiments are not necessarily essential to the invention.

An observation of the equations in the table above is that when $T_1$ is fixed, simple implementation in hardware is plausible. All of them at most require 4 integrators to implement the equation in hardware. By careful simplification, one may even use 2 integrators to perform the function. Thus, a Pulse Frequency Modulation implementation of the equations is natural and has all the advantages listed above.

The preferred embodiments of the present invention and their advantages are best understood by referring to FIGS. 1-9b of the drawings. Like numerals are used for like and corresponding parts of the various drawings.

FIG. 1 illustrates an embodiment of the present invention alone without a AC/DC converter. The apparatus inputs a signal $I_{fb}$ which is a scaled version of a current of the AC/DC converter to be controlled, and outputs a control signal G to control the AC/DC converter. The apparatus forms a current loop to ensure the line input current drawn by the AC/DC converter follow the line voltage and the effective input resistance is set by the signal er. The signal er is generated by a circuitry 14 which compares a signal vo from the load end of the AC/DC converter to a reference level. The signal U, being a group of signals, is used to configure the apparatus to work with different kinds of converters.

The apparatus comprises two function generators 11a and 11b, a pulse generator 12, a flip-flop 13, and a feedback circuitry 14. The circuitry 14 compares a signal at the load end of the AC/DC converter with a reference level to generate the signal er. The function generators 11a and 11b, working at opposite phase and receiving the signal $I_{fb}$, er, U, and ck or bck, output a signal Pa and Pb. When ck or bck is high, the receiving function generator is reset and the output Pa or Pb is low. When the ck or bck is low, the receiving function generator starts compute the equation $P = k_{11}t_1 + k_{12}t_2 - k_{21}q_1 - k_{22}q_2$. Initially (just after a reset), P is low. After a while, the signal P becomes high and P activates the pulse generator 12. The pulse generator 12 starts generating a pulse of fixed time duration at the rising edge of the signal P and then output G stays low for a minimum time duration. G will remain low again if P remains low. The flip-flop 13 generates the opposite phase signals ck and bck to reset the function generators 11a and 11b at alternate cycle of G. The gate 15 combines the outputs of 11a and 11b to form the signal P.

Figure 2:
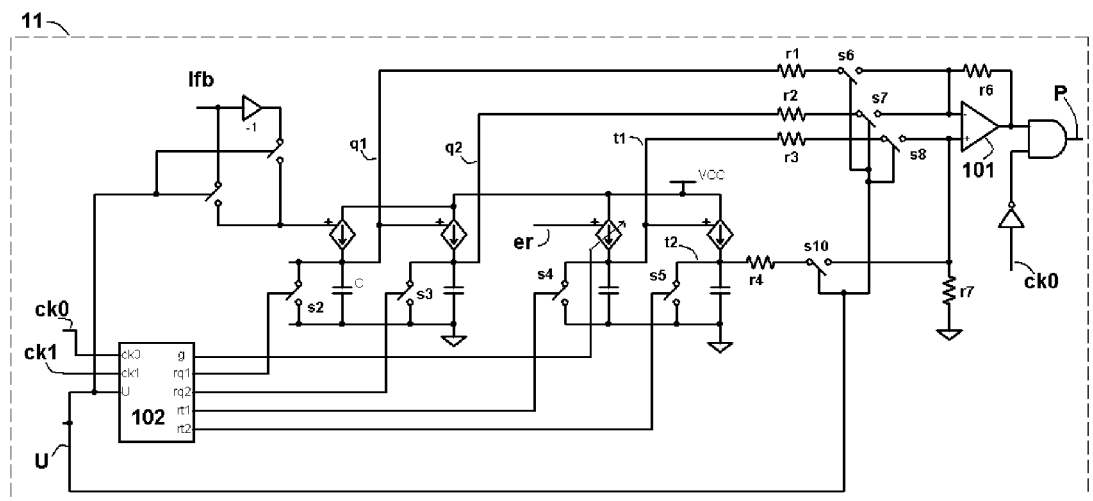
FIG. 2 illustrates an embodiment of the function generator 11 according to the present invention.

FIG. 2 illustrates an embodiment of the function generator 11 according to the present invention. The function generator 11, receiving the signal $I_{fb}$, er, ck1, ck0 and U, generates the signal P according to the formula $$P = k_{11}t_1 + k_{12}t_2 - k_{21}q_1 - k_{22}q_2 \text{ where}$$

$q_1$ is the integral of the sensed current signal $I_{fb}$ from the AC/DC converter, $q_2$ is the integral of $q_1$, $t_1$ is the integral of a control signal $e_r$ which sets the effective input resistance of the AC/DC converter under controlled;

$t_2$ is the integral of $t_1$, $k_{11} \ldots k_{22}$ are coefficients, controlled by the signal U, switches $S_6 \ldots S_{10}$, and resistors $r_1 \ldots r_7$, vary according to the types of converter to be controlled.

The function generator 11 mainly comprises 4 integration units and a comparator. Each integration unit has a voltage controlled current source and a capacitor. The two integration units on the left hand side integrate the signal which represents the current signal from the AC/DC converter and generate $q_1$ and its integral $q_2$. The two integration units on the right hand side generate the ramp signal $t_1$ and its integral $t_2$. The gain of the integrator of $t_1$ is programmable by the signal U and the clock signal ck1. The comparator 101 compares selected signals from the integration units and outputs the signal P. The switches $S_2$-$S_5$ reset the state of $q_1$, $q_2$, $t_1$ and $t_2$ at appropriate time. A integration unit can be reset during the whole cycle by using ck0 or be reset during the fixed width pulse G by ck1. The former case implies the integration starts at time zero and the later case implies the integration starts at time $T_1$. This is determined by the signal U which configures the unit 102 to connect individual switch to the ck1 or the ck0 signal or their inverted. During the reset state, the output is disabled and P equals zero.

When this invention is to be applied to converters with more complex transfer functions, one may extent the design in FIG. 2 to include more integrators to handle higher order integrals. Then the function generator should be able to generate a output signal P according to the formula $$P = k_{11}t_1 + k_{12}t_2 + \ldots + k_{1n}t_n - k_{21}q_1 - k_{22}q_2 - \ldots - k_{2n}q_n$$
where $k_{11} \ldots k_{2n}$ are coefficients configurable by the signal U, $t_n$ is the integral of $t_{n-1}$ and $q_n$ is the integral of $q_{n-1}$.

Further detail of changes needed is trivial and obvious to those skilled in the art.

Figure 3:
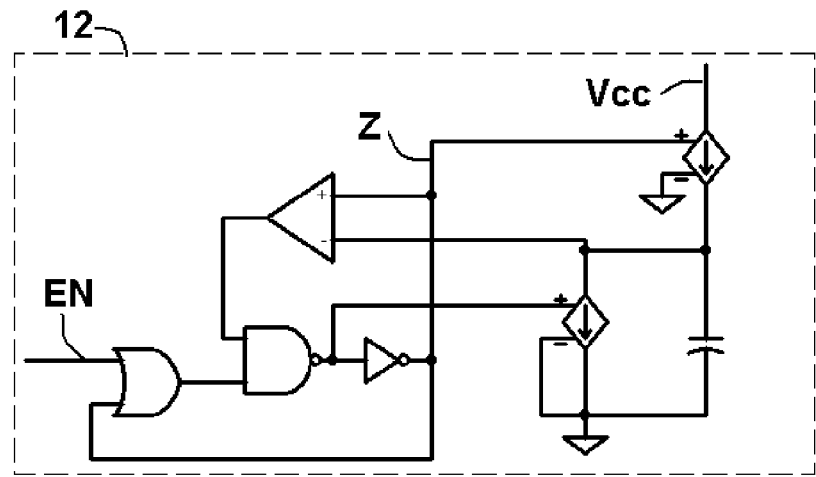
FIG. 3 illustrates an embodiment of the pulse generator 12 according to the present invention.

FIG. 3 illustrates an embodiment of the pulse generator 12 according to the present invention. The output of the pulse generator 12 has a fixed pulse width and a minimum pulse off time, i.e. a minimum oscillation period and a maximum duty cycle. The pulse generator starts generate a fixed width pulse and then a minimum pulse off time when the signal EN rises from low to high. The pulse off time can be extended by holding EN low. When EN is still high after the minimum pulse off time, the pulse generator 12 will begin a cycle with a new pulse.

Figure 4A:
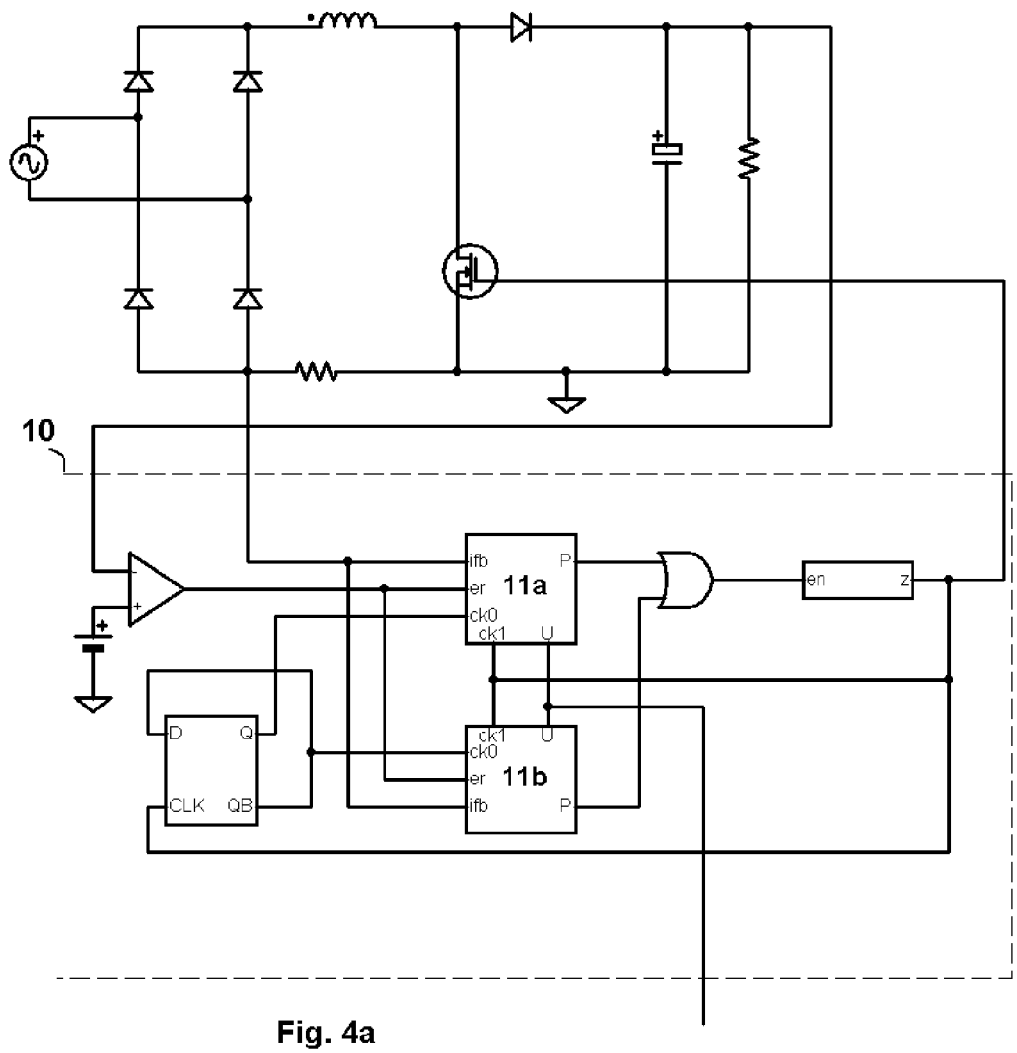
FIG. 4*a* illustrates an embodiment of the present invention when the AC/DC converter to be controlled is a boost converter.

FIG. 4a illustrates an application of the present invention when the AC/DC converter to be controlled is a boost converter and the $I_{fb}$ signal is a scaled version of the inductor current. For this application, the function generator 11 is configured by U to generate the signal P according to the formula $P=k_{11}t_1-k_{21}q_1$.

Figure 4B:
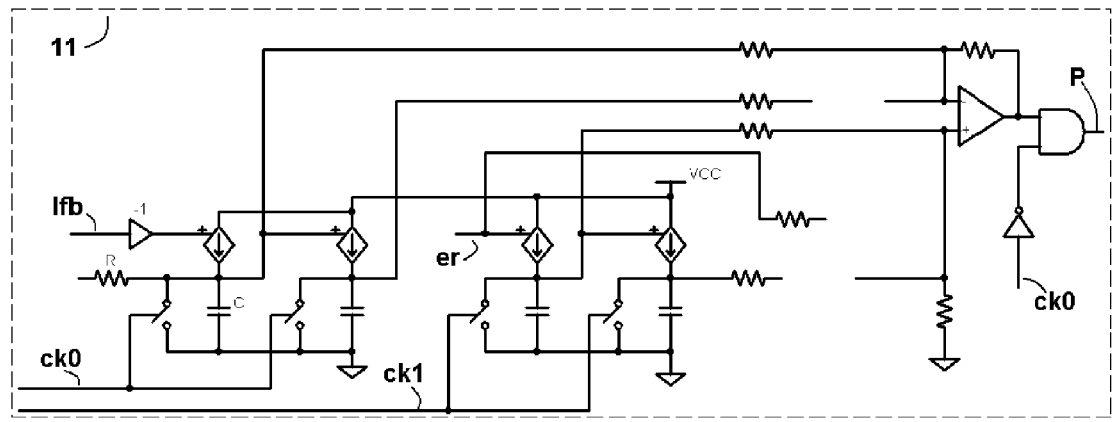
FIG. 4*b* illustrates an embodiment of the function generator 11 in FIG. 4*a* for the formula $P=k_{11}t_r-k_{21}q_1$ according to the present invention.
Figure 4C:
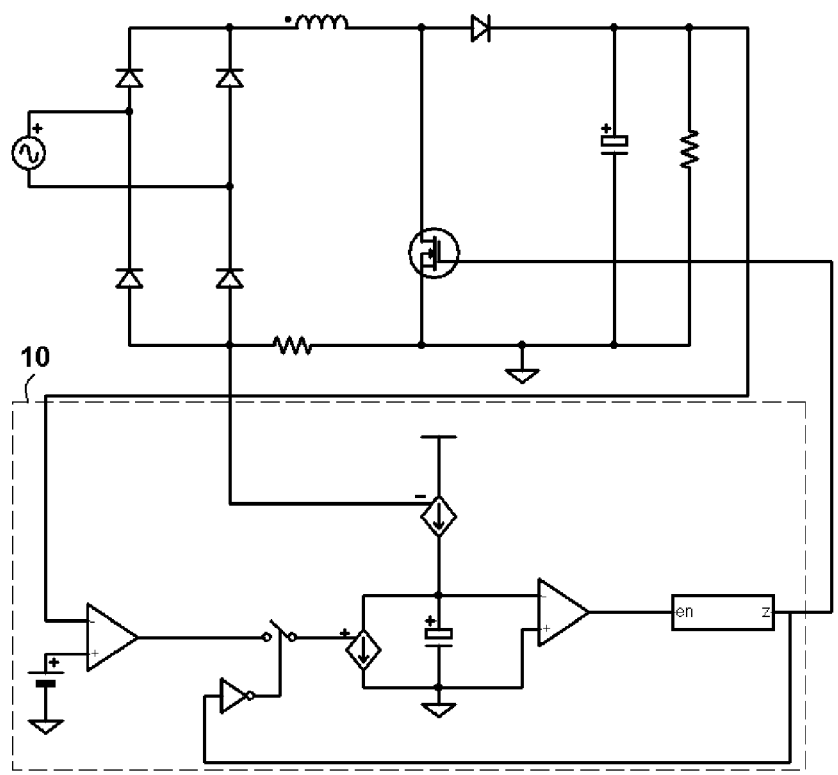
FIG. 4*c* illustrates a simplified equivalence of FIG. 4*a*.

FIG. 4b illustrates an embodiment of the function generator 11 in this application according to the present invention. The unit 102 is replaced by equivalent wires and the integral $t_1$ starts after ck1. FIG. 4c illustrates how the generator 11 in FIG. 4b can be simplified to use a single integrator only. In FIG. 4c, the equivalence is shown together with a boost converter according to the present invention.

Figure 5A:
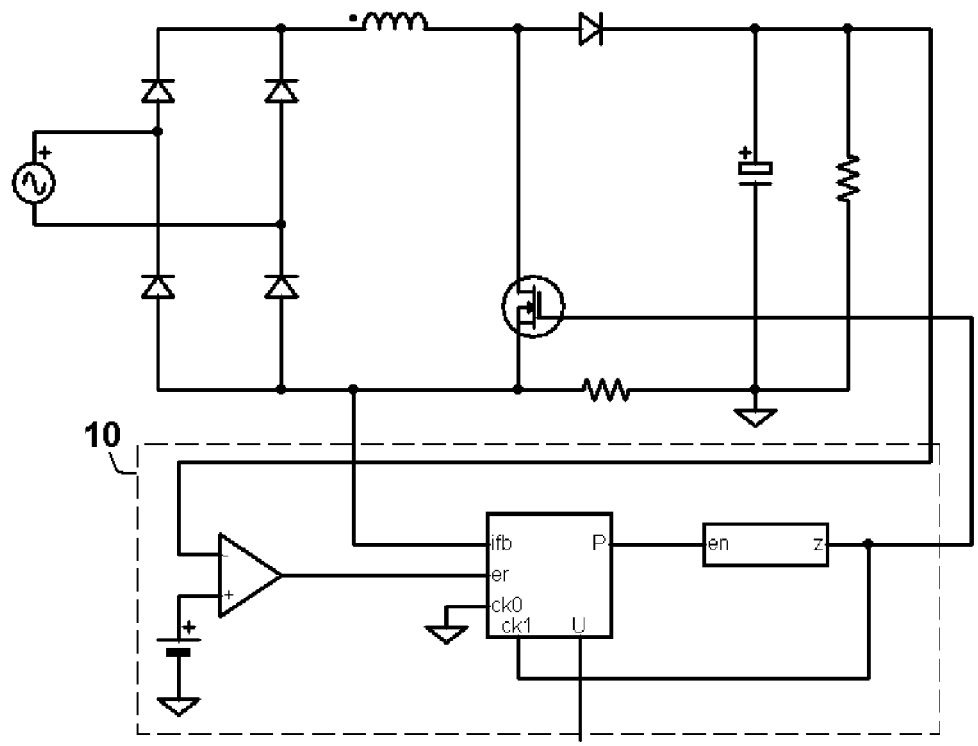
FIG. 5*a* illustrates another embodiment of the present invention when the AC/DC converter to be controlled is a boost converter.

FIG. 5a illustrates another embodiment of the present invention when the AC/DC converter to be controlled is a boost converter and the $I_{fb}$ signal is a scaled version of the diode current. For this application, the function generator 11 is configured by U to generate the signal P according to the formula $P=k_{12}t_2-k_{21}q_1-k_{22}q_2$.

Figure 5B:
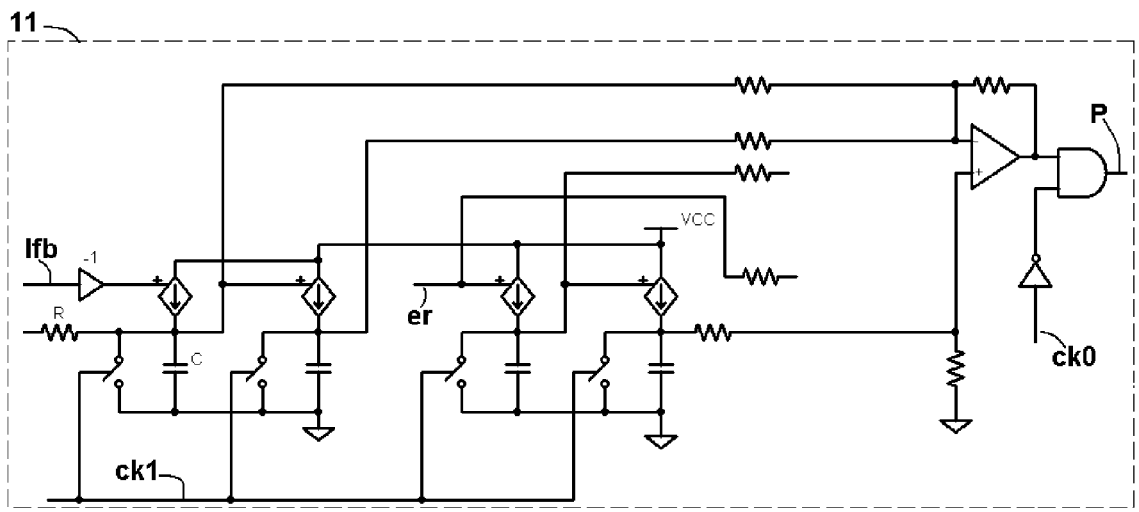
FIG. 5*b* illustrates an embodiment of the function generator 11 in FIG. 5*a* for the formula $P=k_{12}t_2-k_{21}q_1-k_{22}q_2$ according to the present invention.
Figure 5C:
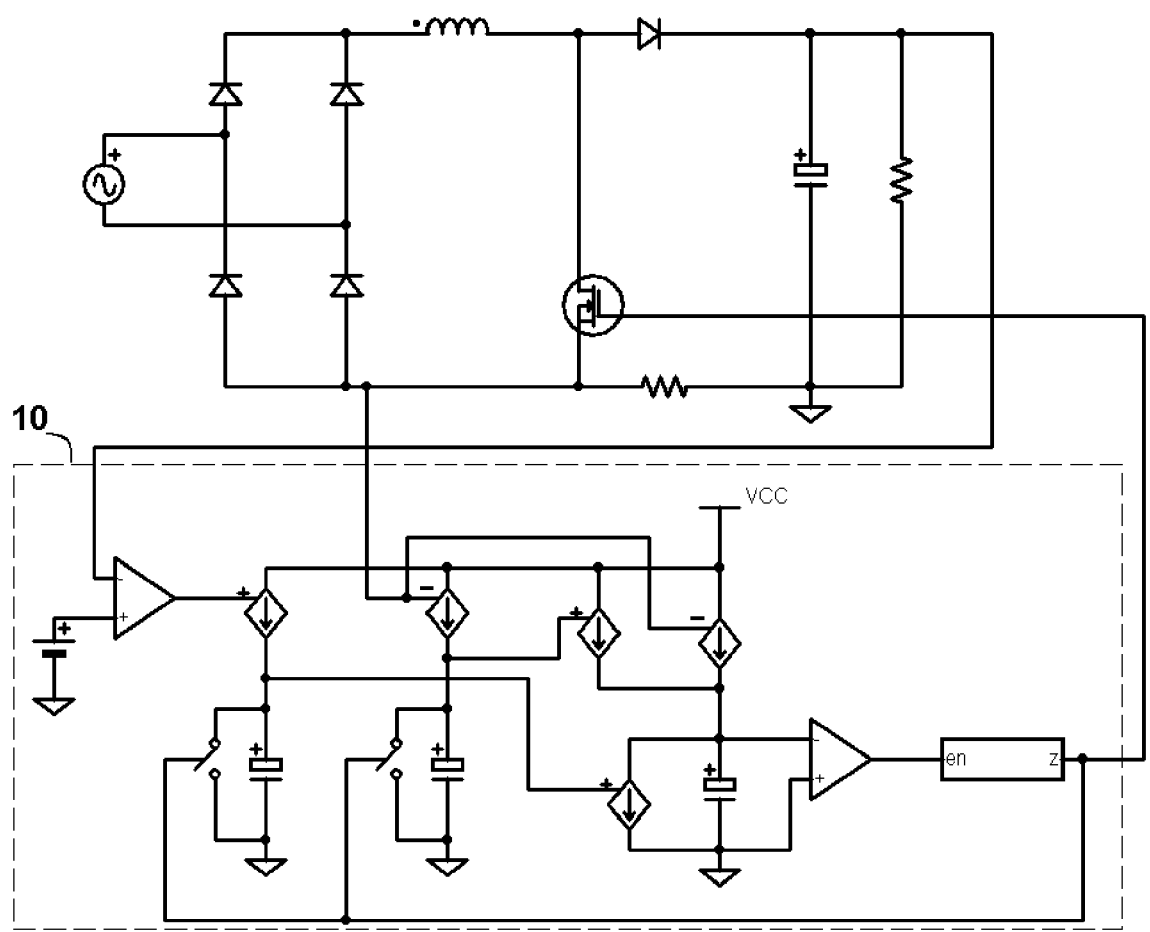
FIG. 5*c* illustrates a simplified equivalence of FIG. 5*a*.

Since the diode current is zero during the fixed width pulse, all integrals $t_1$, $t_2$, $q_1$, and $q_2$ can start after the ck1 and the power factor correction apparatus shown in FIG. 1 can be further simplified to that shown in FIG. 5a. FIG. 5b illustrates an embodiment of the function generator 11 in this application according to the present invention. FIG. 5c illustrates a simplified equivalence of the generator 11 in FIG. 5b and is shown together with a boost converter according to the present invention. Thus FIG. 5c is a simplified equivalence of FIG. 5a.

Figure 6A:
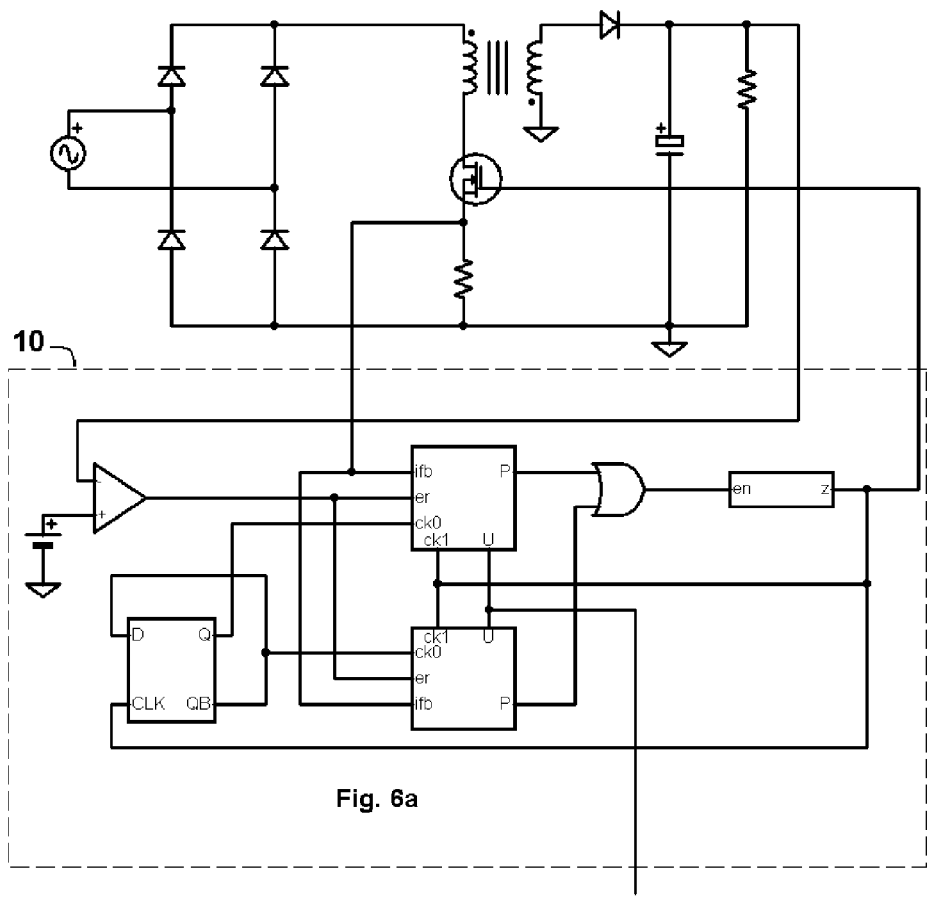
FIG. 6*a* illustrates an embodiment of the present invention when the AC/DC converter to be controlled is a Flyback converter.

FIG. 6a illustrates an embodiment of the present invention when the AC/DC converter to be controlled is a Flyback converter and the $I_{fb}$ signal is a scaled version of the switch current. For this application, the function generator 11 is configured by U to generate the signal P according to the formula $P=k_{12}t_2-k_{22}q_2$.

Figure 6B:
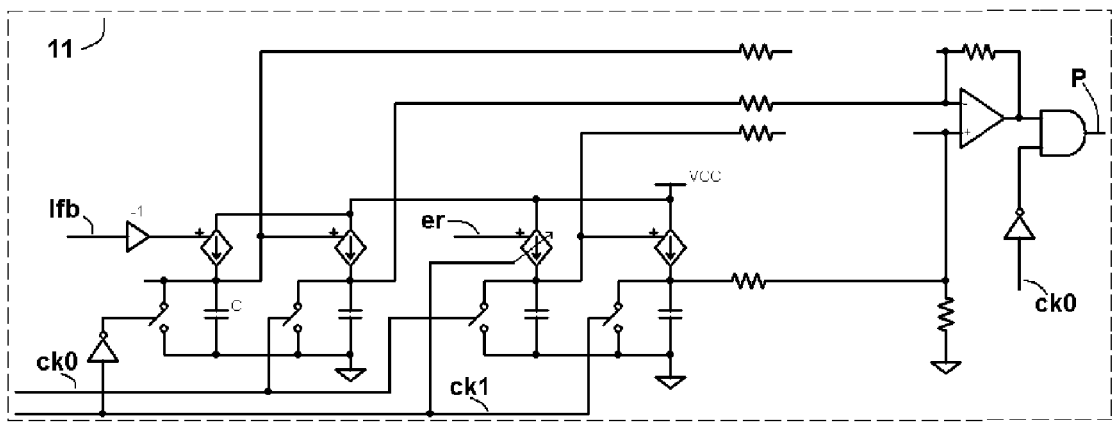
FIG. 6*b* illustrates an embodiment of the function generator 11 in FIG. 6*a* for the formula $P=k_{11}t_1+k_{12}t_2-k_{21}q_1$ according to the present invention.

FIG. 6b illustrates an embodiment of the function generator 11 in FIG. 6a for the formula $P=k_{12}t_2-k_{22}q_2$. The integral $t_2$ starts after ck1. The gain of the integrator for the signal $t_1$ is programmable by ck1. When ck1 is high, the gain is 1. When ck1 is low, the gain is 2.

Figure 7A:
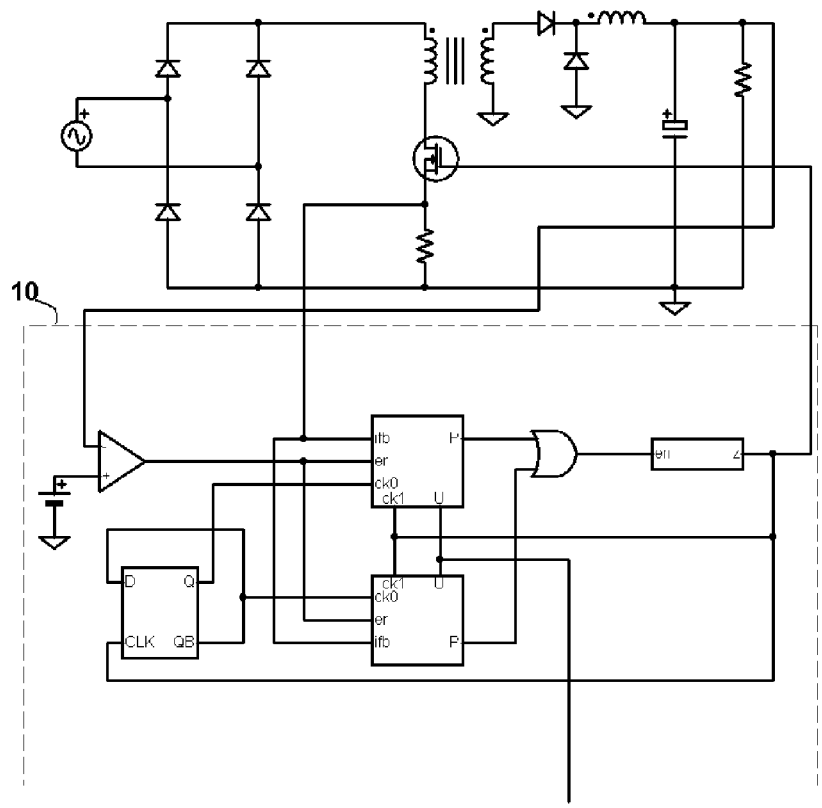
FIG. 7*a* illustrates an embodiment of the present invention when the AC/DC converter to be controlled is a forward converter.

FIG. 7a illustrates an embodiment of the present invention when the AC/DC converter to be controlled is a forward converter and the $I_{fb}$ signal is a scaled version of the switch current. For this application, the function generator 11 is configured by U to generate the signal P according to the formula $P=k_{12}t_2-k_{22}q_1$.

Figure 7B:
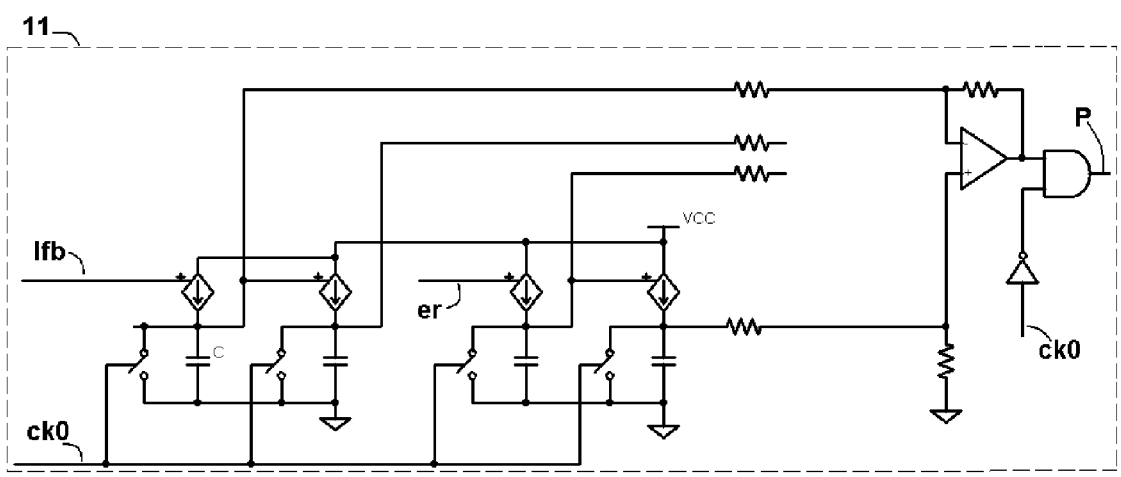
FIG. 7*b* illustrates an embodiment of the function generator 11 in FIG. 7*a* when the formula is $P=k_{12}t_2-k_{21}q_1$ according to the present invention.
Figure 7C:
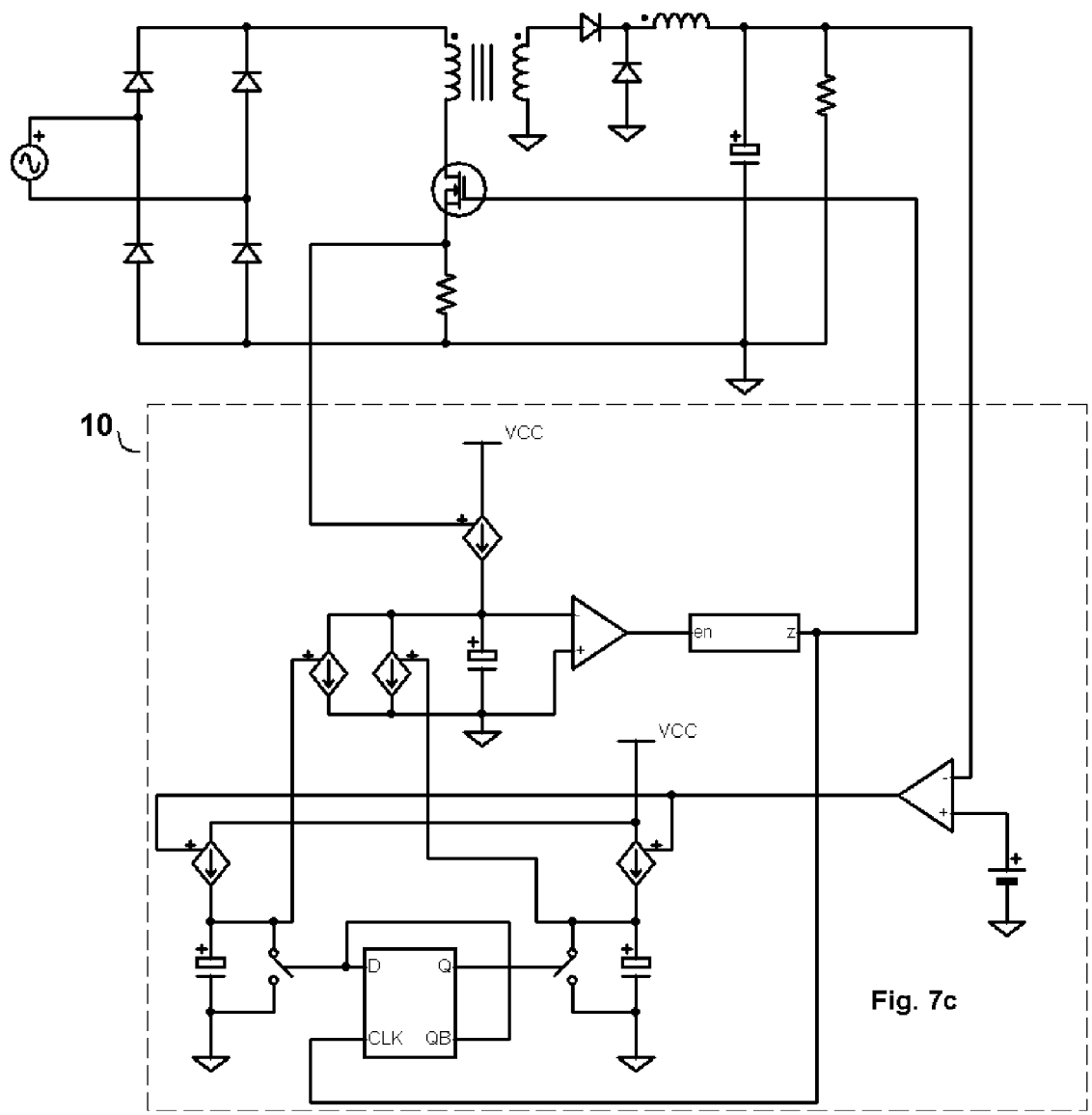
FIG. 7*c* illustrates a simplified equivalence of FIG. 7*a*.

FIG. 7b illustrates an embodiment of the function generator 11 in FIG. 7a when the formula is $P=k_{12}t_2-k_{22}q_1$. Since the switch current is zero during $T_0$, all integrators can be active throughout $T_1$ and $T_0$. FIG. 7c illustrates a simplified equivalence of FIG. 7a.

Figure 8:
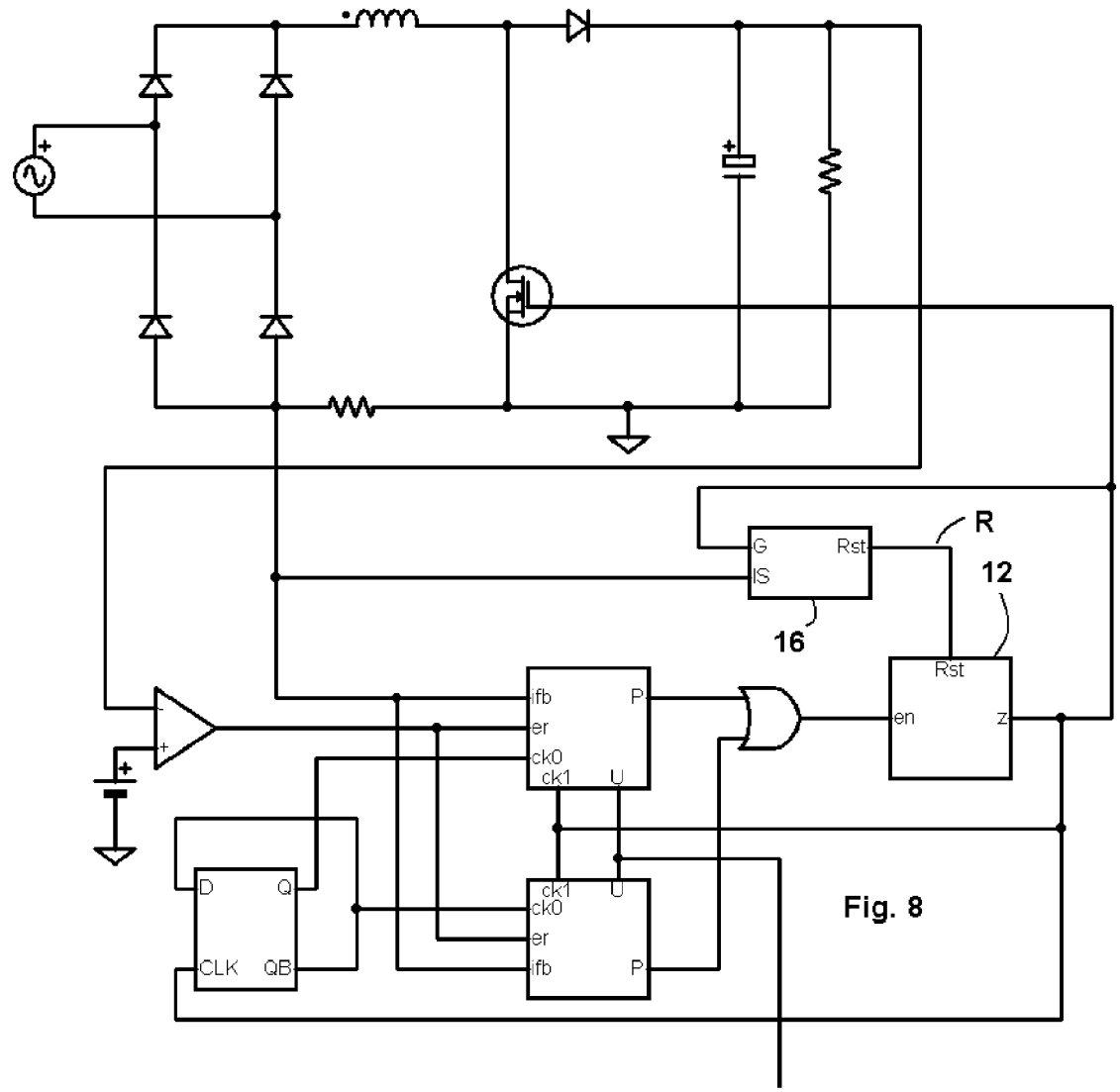
FIG. 8 illustrates an embodiment of the present invention where the PFM unit is enhanced with a current limiting function.

FIG. 8 illustrates an embodiment of the present invention with the current limiting feature. The pulse generator 12 has a reset input which will force the generator to go into pulse-off mode. The current limiting unit 16 has a leading edge blanking function which ensures the pulse has a minimum width. If the sensed current, after a banking interval of the pulse G, is higher than a reference level, a pulse R is output to reset the generator 12. The switch will be turned off instantly.

Figure 9A:
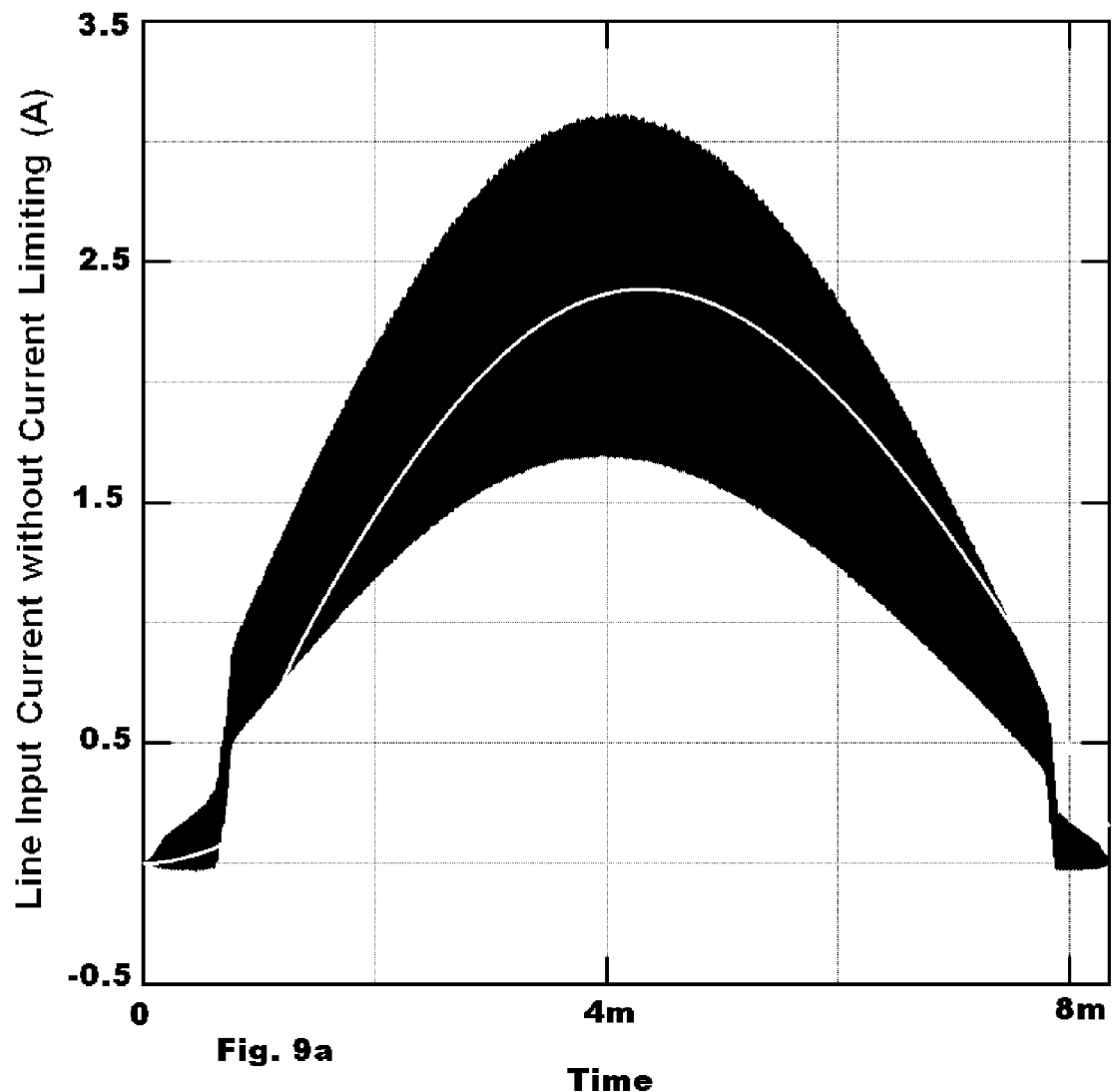
FIG. 9*a* illustrates line input current of the boost converter in FIG. 8 without the current limiting function.
Figure 9B:
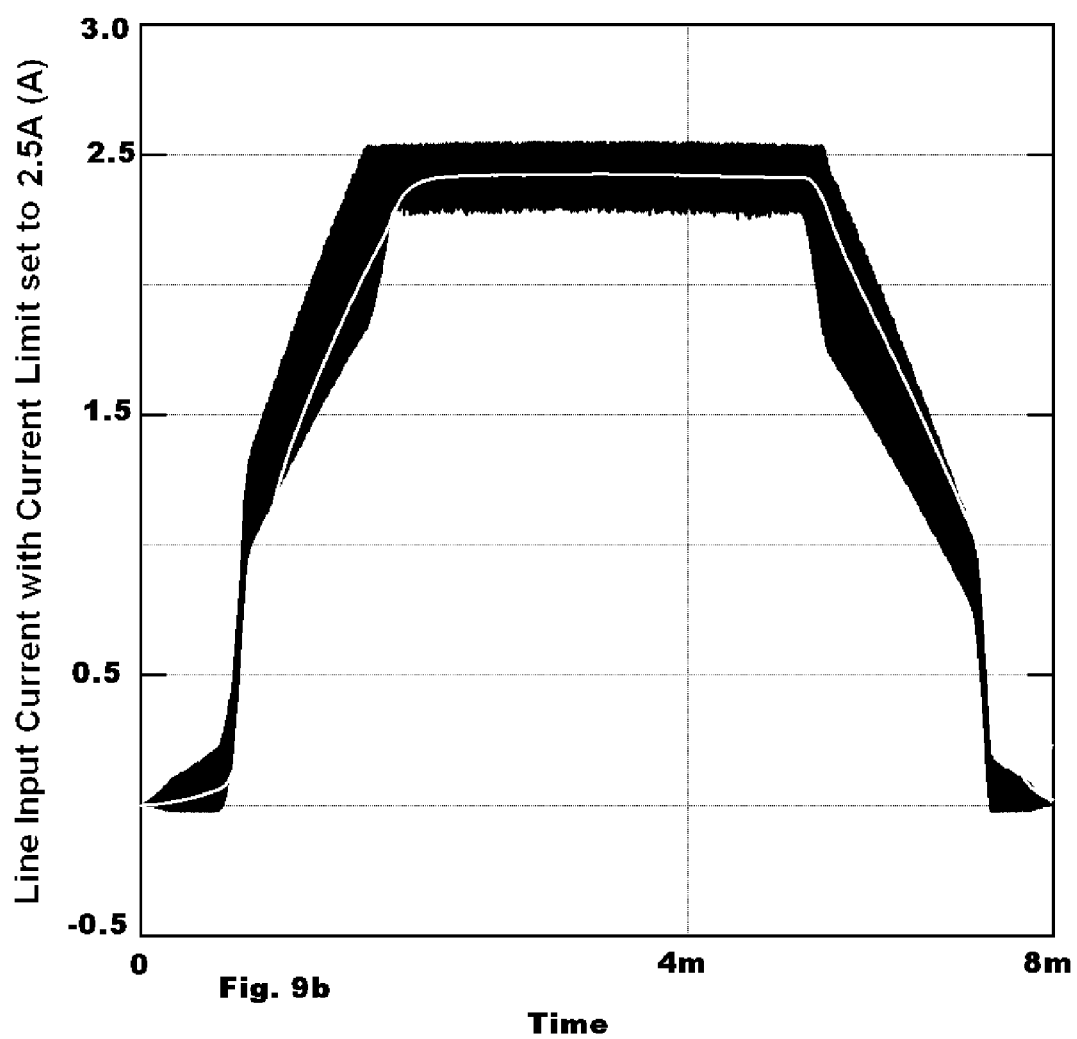
FIG. 9*b* illustrates line input current of the boost converter in FIG. 8 with the current limiting function activated.

The waveforms in FIG. 9a and FIG. 9b are the line input current of the boost converter in FIG. 8 working at 90 VAC. The middle white lines are the averaged value. FIG. 9a is the case without current limiting. The current limit threshold in this case is set much higher than the peak of the input current such that the current limiting function is effectively disabled. FIG. 9b is the case with the current limiting function activated. The threshold is set to 2.5 A. The peak of the current is bounded and the averaged current becomes a chopped sinewave. However, the harmonics is still well within the permissible range of the regulation.

Although the present invention has been described by way of exemplary embodiments and equivalence on a boost converter, a Flyback converter, and a forward converter, it should be understood that the present invention can be applied to other type of converters, e.g. a Cuk or Zeta converter or similar. This is obvious from the table of equations above.

Changes and substitutions needed to use the present invention on other types of converters may be made by those skilled in the art without departing from the scope of the present invention which is defined by the appended claims. In particular, extension of the present invention to include more integrators to handle higher order integrals when it is deemed needed for converters with complex transfer functions is trivial and obvious to those skilled in the art.

What is claimed is:

1. A power factor correction control apparatus coupled to a AC/DC converter to emulate a resistive load on the input power line comprising:
   current sensing means for sensing a current inside the AC/DC converter which is related to the current drawn by the AC/DC converter;
   comparing means for sensing a signal which is related to the output voltage of the AC/DC converter and comparing it with a reference level to compute a voltage $e_r$;
   function generating means including a plurality of integrating units for multiple-integrating the sensed current and the voltage $e_r$ to generate a signal P;
   resetting means for resetting individually said plurality of integrating units at designated time; and
   pulse generating means for generating a fixed width pulses G to control the AC/DC converter when an enable signal P is received from the function generating means.

2. The power factor correction control apparatus according to claim 1, wherein the function generating means includes
   first integrating unit for integrating the sensed current to compute a voltage $q_1$ where the start time of the integration is controllable by a signal;
   n−1 second integrating units each for integrating the voltage $q_{n-1}$ to compute a voltage $q_n$ where the start time of the integration is controllable by a signal and n is an integer greater than or equal to two;
   third integrating unit for integrating the voltage $e_r$ to compute a voltage $t_1$ where the start time of the integration is controllable by a signal;
   n−1 fourth integrating units each for integrating the voltage $t_{n-1}$ to compute a voltage $t_n$ where the start time of the integration is controllable by a signal and n is a integer greater than or equal to two;

function generating unit for generating the signal P according to the formula $P=k_{11}t_1+k_{12}t_2+ \ldots +k_{1n}t_n-k_{21}q_1-k_{22}q_2- \ldots -k_{2n}q_n$ by using signals from the first, second, third and fourth integrating units and whose coefficients $k_{11}, \ldots, k_{2n}$ are configurable by a group of signal U input to the respective integrating units.

3. The power factor correction control apparatus according to claim 1, wherein the pulse generating means generate a pulse of fixed width when the triggering signal P rises from low to high and then remains off for a minimum interval.

4. The power factor correction control apparatus according to any one of claims 2-3, wherein the AC/DC converter is a boost converter and the sensed signal is a scaled version of the inductor current, the function generating means is configured by the signal U to generate the signal P according to the formula $P=k_{11}t_1-k_{21}q_1$.

5. The power factor correction control apparatus according to any one of claims 2-3, wherein the AC/DC converter is a boost converter and the sensed signal is a scaled version of the diode current, the function generating means is configured by the signal U to generate the signal P according to the formula $P=k_{12}t_2-k_{21}q_1-k_{22}q_2$.

6. The power factor correction control apparatus according to any one of claims 2-3, wherein the AC/DC converter is a flyback converter and the sensed signal is a scaled version of the switch current, the function generating means is configured by the signal U to generate the signal P according to the formula $P=k_{12}t_2-k_{22}q_2$.

7. The power factor correction control apparatus according to any one of claims 2-3, wherein the AC/DC converter is a forward converter and the sensed signal is a scaled version of the switch current, the function generating means is configured by the signal U to generate the signal P according to the formula $P=k_{12}t_2-k_{22}q_1$.

8. The power factor correction control apparatus according to claim 1, further comprising a current limiting means for comparing said sensed signal from the AC/DC converter with a threshold level and outputting a reset signal R to the pulse generating means when said sensed signal exceed said threshold level.

* * * * *